United States Patent [19]

Short

[11] Patent Number: 5,419,245
[45] Date of Patent: May 30, 1995

[54] FOOD PRESS APPARATUS WITH BIASED PRESS PLATE

[75] Inventor: R. Stanford Short, Bryan, Ohio

[73] Assignee: Nemco, Incorporated, Hicksville, Ohio

[21] Appl. No.: 242,535

[22] Filed: May 13, 1994

[51] Int. Cl.⁶ .............................................. B30B 9/04
[52] U.S. Cl. ................................. 100/125; 100/110; 100/132; 100/268; 100/289
[58] Field of Search ........ 100/110, 116, 125, 131–135, 100/268, 289

[56] References Cited

U.S. PATENT DOCUMENTS

| | | | |
|---|---|---|---|
| 127,427 | 6/1872 | Potter | 100/125 |
| 162,407 | 4/1875 | Noe | 100/116 |
| 179,615 | 7/1876 | Schiller | 100/134 X |
| 185,124 | 12/1876 | Murphy | 100/268 |
| 924,122 | 6/1909 | Williams | 100/289 |
| 1,187,118 | 6/1916 | Williamson | 100/135 X |
| 1,446,279 | 2/1923 | Szafka | 100/135 X |
| 4,334,469 | 6/1982 | Tanner et al. | 100/110 |
| 4,579,028 | 4/1986 | Neidhardt | 83/109 |

FOREIGN PATENT DOCUMENTS

| | | | |
|---|---|---|---|
| 188214 | 1/1957 | Australia | 100/268 |
| 1087 | 1/1885 | United Kingdom | 100/268 |

OTHER PUBLICATIONS

Nemco Easy Dicer Onion Dicer brochure with Operating and Maintenance Instructions, Jun. 1989.
Nemco Spiral Fry Potato Cutter brohcure with Assembly, Operating, and Maintenance Instructions, Jun. 1990.

*Primary Examiner*—Stephen F. Gerrity
*Attorney, Agent, or Firm*—Baker & Daniels

[57] ABSTRACT

A food press apparatus for squeezing liquid from a food product in a container. The food press apparatus includes a drive component operatively connected to a frame. The drive component moves a plunger, which is operatively connected to a press plate that engages one end of the container. A spring compressible between the plunger and the press plate biases the press plate against the container end. A platform for engaging another end of the container is positioned in spaced relationship with the press plate to allow introduction of the container therebetween. As the press plate moves toward the container engaging platform, the food product is compressed therebetween to squeeze liquid from the food product.

9 Claims, 4 Drawing Sheets

FOOD PRESS APPARATUS WITH BIASED PRESS PLATE

BACKGROUND OF THE INVENTION

This invention pertains to a press apparatus, and, in particular, to a press apparatus for use in draining liquid from canned food products.

An assortment of different food products such as tuna are packaged into cans or containers along with liquids such as oil or water. When a consumer desires to use the packaged food product, the container is first opened, and then typically the packing liquid is poured or drained from the container prior to the removal of the packaged food products. Food products which have a tendency to absorb and retain the packing liquid complicate the liquid draining process. For example, in order to adequately drain the liquid in a can of tuna, excess liquid is initially poured out. Then, the opened or cut off can lid is typically pressed inward onto the tuna while the container is inverted, thereby squeezing out liquid in the tuna.

While removing liquids from some food products is rather a simple and speedy task when the container is small, removing liquids from food products packaged in larger containers is usually a far more labor intensive task. In the food service industry, canned food products are utilized in bulk and therefore frequently packaged in large cans. The size and weight of these containers, as well as the actual amount of liquid possibly retained within the contained food products, makes manual draining difficult.

For example, tuna used by restaurants in preparing such dishes as tuna salad often comes in packaged cans weighing several pounds or more. After excess liquid is first poured out from the opened can, the large quantities of liquid retained in the tuna meat must be squeezed out or the salad dressing used in making the salad may not adhere to the tuna. To drain the liquids in the past, manual squeezing techniques more appropriate for small serving size cans have been used. These techniques are undesirably labor intensive due to the significant quantities of retained liquid. Past makeshift attempts to partially mechanize the draining process included cutting off a can top end or lid, inverting the can with the lid inside and placing the lid on a raised object in the sink, and placing a heavy object or weight on the bottom can end which, due to the can inversion, faces upward. As the packaged liquid drained off, the can settled under the weight to further compress or squeeze the tuna and thereby further drain the tuna. However, the finite amount of weight capable of readily being lifted by food service employees and then carefully balanced on the can results in relatively long times for the liquid to drain in this manner. Thus, it is desirable to provide an apparatus which better mechanizes squeezing operations to remove liquid from food product containers to reduce the labor required for such operations.

SUMMARY OF THE INVENTION

In one form thereof, the present invention provides a press apparatus for squeezing liquid from a food product in a container which includes a frame member, a drive component operatively connected to the frame member, a press element for engaging one end of the container, and a platform sized and shaped to be received within the container interior. The platform is positionable in spaced relationship with said press element to allow introduction of the container therebetween. Either the press element or the platform is operatively connected to the drive component to be movable thereby. During operation, the press element and the platform are brought together such that the food product is compressed therebetween to squeeze liquid from the food product.

In another form thereof, the present invention provides a food press apparatus for squeezing liquid from a food product in a container which includes a frame, a drive component which is operatively connected to the frame and which is movable in a first direction relative to the frame, a plunger operatively connected to the drive component to be movable therewith, a press plate for operatively engaging one end of the container, wherein the press plate is operatively connected to the plunger, at least one spring compressible between the plunger and the press plate for biasing the press plate in the first direction away from the plunger, and a platform for engaging another end of the container. The platform is positioned in spaced relationship with the press plate to allow introduction of the container therebetween, and the press plate moves toward the container engaging platform when moving in the first direction.

In still another form thereof, the present invention provides a contained food press apparatus for squeezing liquid from a food product in a container including a frame and a drive screw, which is threadedly connected to the frame and movable in a first direction when rotated relative to the frame. The press apparatus also includes a rotatable crank assembly connected to the drive screw, a hanger assembly for removably mounting the frame to a sink wall, a plunger operatively connected to the drive screw to be movable therewith, a press plate for operatively engaging one end of the container, wherein the press plate is operatively connected to the plunger, a spring compressible between the plunger and the press plate for biasing the press plate in the first direction away from the plunger, and a platform plate for engaging another end of the container. The platform plate is attached to the frame and positioned in spaced relationship with the press plate to allow introduction of the container therebetween. The platform plate is sized and shaped to fit within an interior of the container. The press plate moves toward the container engaging platform plate when moving in the first direction.

An advantage of the canned food press apparatus of the present invention is that it mechanizes the removal of liquid from packaged food products. Another advantage of the present invention is that it can operate to squeeze liquid from packaged food products without an operator being continuously present. Still another advantage of the present invention is its simple but effective design, which facilitates its construction and maintenance.

BRIEF DESCRIPTION OF THE DRAWINGS

The above mentioned and other advantages and objects of this invention, and the manner of attaining them, will become more apparent and the invention itself will be better understood by reference to the following description of an embodiment of the invention taken in conjunction with the accompanying drawings, wherein.

Figure 1:
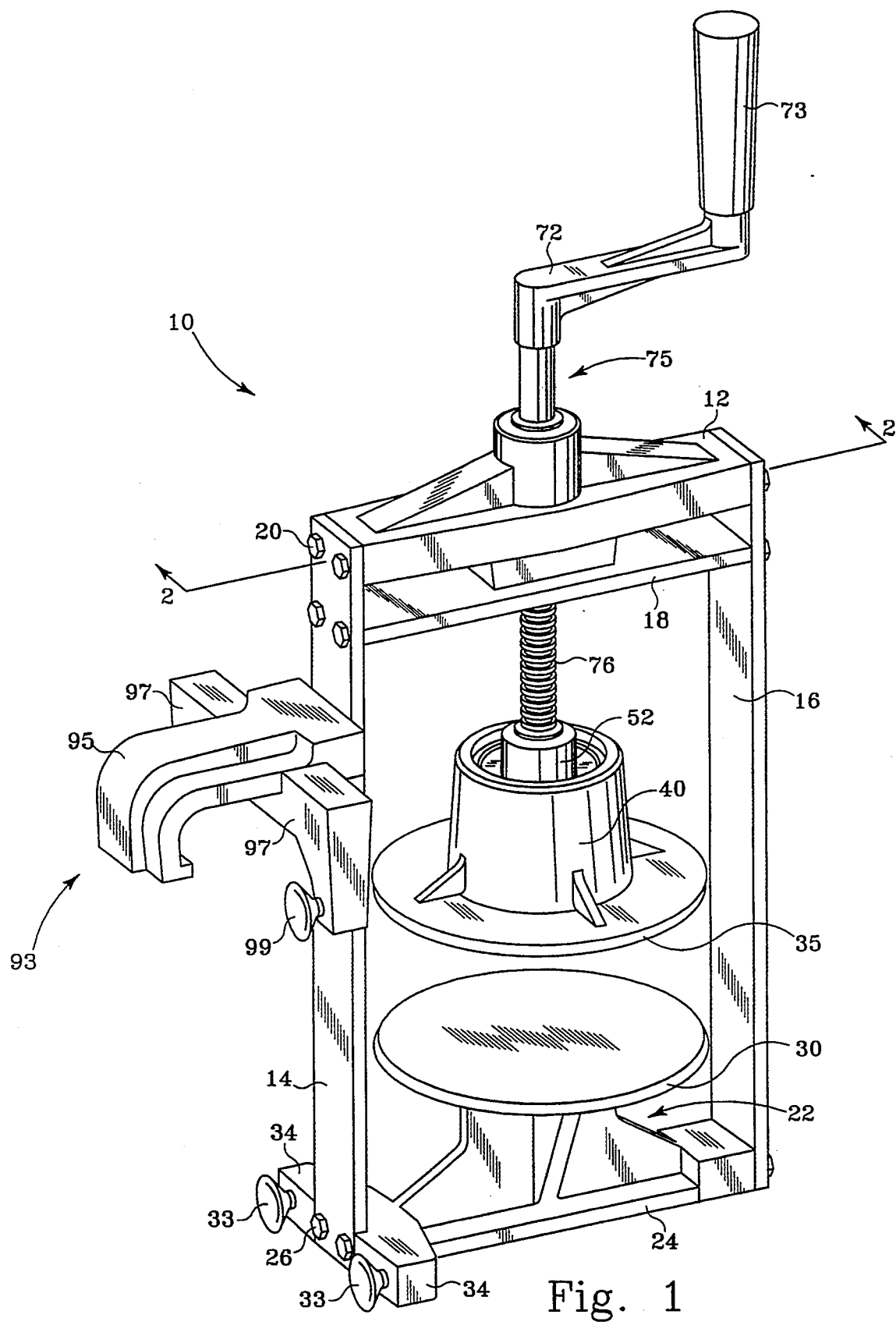
FIG. 1 is a perspective view of a preferred embodiment of the canned food press apparatus of the present invention.

Corresponding reference characters indicate corresponding parts throughout the several views. Although the drawings represent an embodiment of the invention, the drawings are not necessarily to scale and certain features may be exaggerated in order to better illustrate and explain the present invention. The exemplification set out herein illustrates one preferred embodiment of the invention, in one form, and such exemplification is not to be construed as limiting the scope of the invention in any manner.

DESCRIPTION OF THE PREFERRED EMBODIMENT

Referring to FIG. 1, there is shown a canned food press apparatus of the present invention, generally designated 10, removed from its typical work environment of a sink or other liquid catch basin. While the various shapes and sizes of the components disclosed herein are preferred when press apparatus 10 is utilized for draining large, cylindrical cans of tuna, those of skill in the art will appreciate that with minor modifications the present invention can advantageously be employed in many situations. References to can or canned throughout the specification and claims encompasses both conventional, cylindrical cans as well as otherwise shaped containers. Moreover, while shown assembled as a complete, portable unit which can be installed on a sink or removed therefrom without the use of tools and in a minimal amount of time, press apparatus 10 can be otherwise constructed within the teachings of the present invention. For instance, the components of press apparatus 10 could be separately mounted to a surface such as a tub bottom.

Press apparatus 10 includes a press plate supporting frame of top beam 12 mounted at the top ends of vertical side bars 14, 16. Positioned immediately below top beam 12, cross beam 18 spans and is fixed to side bars 14, 16. Beam 12 is preferably cast from aluminum, and beam 18 and side bars 14, 16 are preferably made from wrought bar aluminum, so as to be strong but lightweight. In the shown embodiment, in addition to increasing the structural rigidity of the press plate supporting frame, cross beam 18 functions to retain a drive shoe set 82 within top beam 12 in a manner described more fully below. Cross beam 18 and top beam 12 are connected to side bars 14, 16 by fasteners 20, which are preferably hex head stainless steel screws inserted into threaded bores in beams 12, 18.

A container supporting base, generally designated 22, is spaced beneath cross beam 18 at the bottom of press apparatus 10. Supporting base 22 includes a horizontal base beam 24 connected to side bars 14, 16 via fasteners 26 inserted into threaded bores in beam 24. A flanged support column 28 is formed integral with and upwardly extending from base beam 24. A container engaging platform plate 30 is preferably integrally formed atop column 28. Platform plate 30 is circular in shape and has a diameter sized to fit within the interior diameter or width of a commercially sized tuna can for which platform plate 30 is particularly designed. To modify the illustrated preferred design to provide press apparatus 10 with increased use versatility, platform plate 30 could, for example, be mechanically mounted to column 28 and replaceable with differently dimensioned platforms, such that press apparatus 10 can be customized for use with smaller, larger, or differently shaped containers. Upper surface 32 of platform plate 30 has a convex shape to assist in the process of squeezing liquid from the container contents. At one end, base beam 24 is formed with two fin-shaped flanges 34 to which are fastened suction cups 33. While shown attached to the press plate supporting frame in this embodiment, it will be appreciated that supporting base 22 could be a separate component. However, integrating supporting base 22 into apparatus 10 advantageously pre-aligns the operative components and makes the unit more readily portable.

Figure 2:
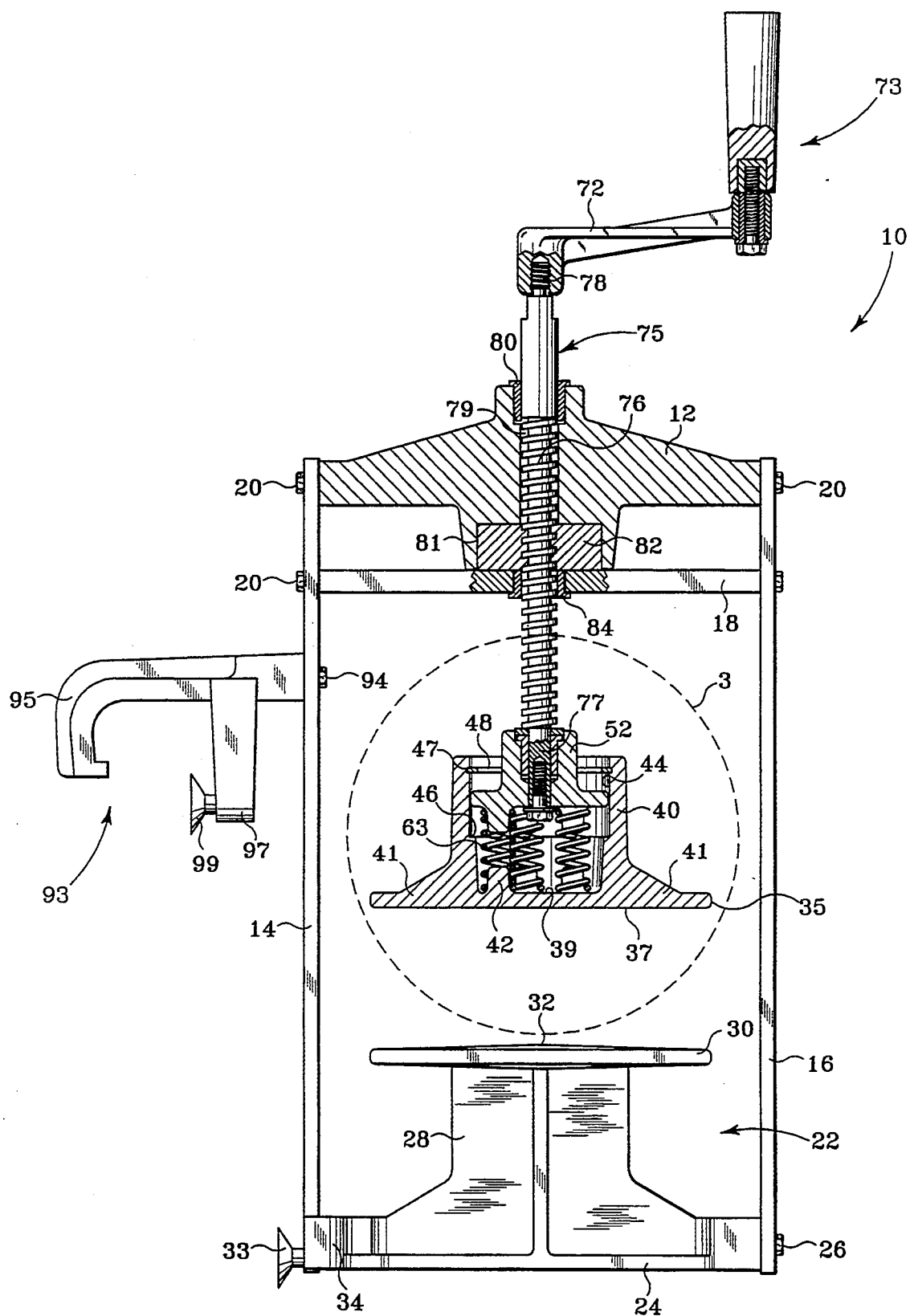
FIG. 2 is a front view, partially in cross-section as taken along line 2—2 of FIG. 1, of the preferred canned food press apparatus.
Figure 3:
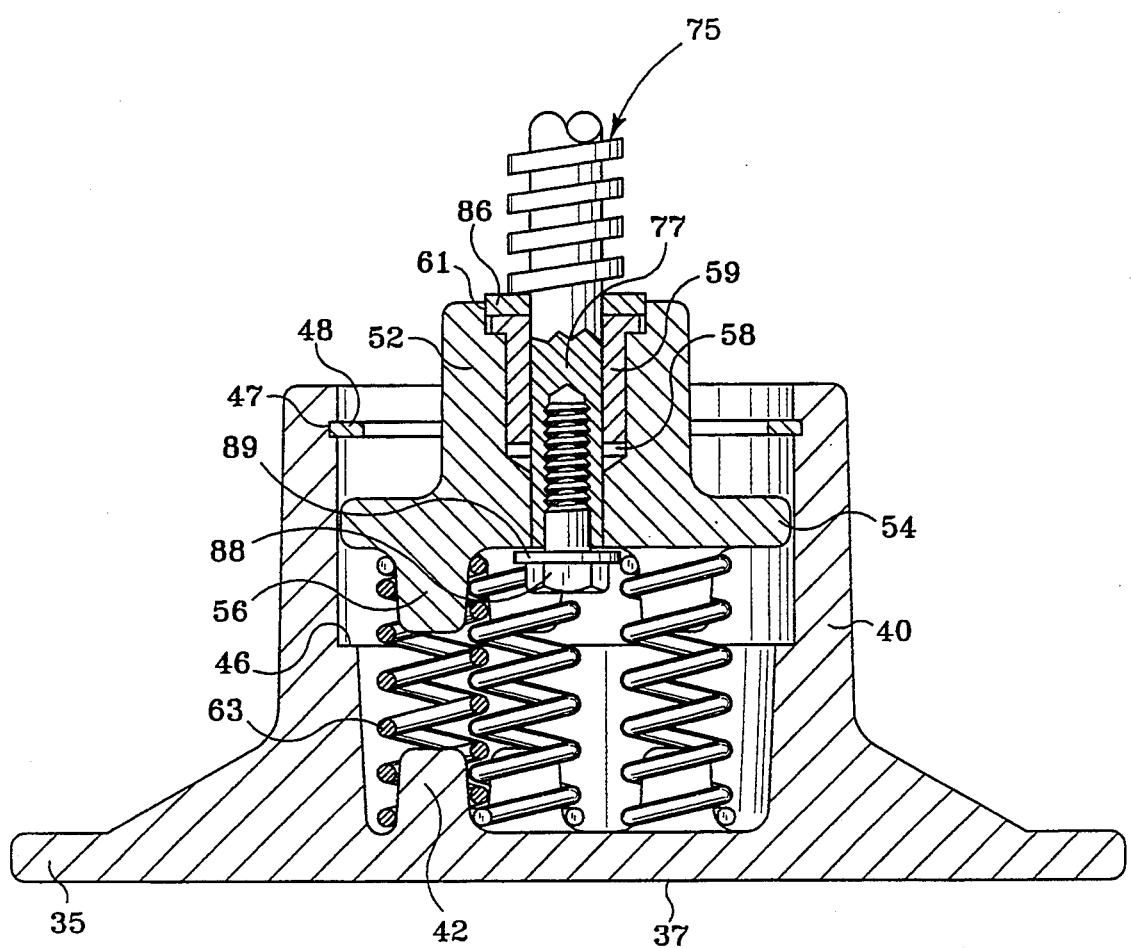
FIG. 3 is an enlarged view of the encircled region referenced as 3 in FIG. 2.

Suspended directly above platform 30 is a cast aluminum press plate 35, which during operation directly contacts the upwardly facing end of a container from which liquid, in the container contents, is being squeezed. Referring to FIGS. 2 and 3, the bottom circular face 37 of press plate 35 is planar. Integrally formed and upwardly extending from press plate upper face 39 is a cylindrical plunger receiving sleeve 40, which is reinforced by gussets 41 spaced at 90° intervals. Within sleeve 40, five pentagonally arranged bosses 42 are formed on upper face 39 and each receive an end of one of compression springs 63. The interior surface 44 of sleeve 40 is fashioned with an annular stop shoulder 46 and a circumferential notch 47 formed near the sleeve upper end. Notch 47 is shaped to accommodate a retaining device or ring 48 which prevents plunger 52 from withdrawing from within sleeve 40. Retaining ring 48 is preferably a Spirolox TM stainless steel ring.

With particular reference to FIG. 3, positioned within sleeve 40 and axially moveable relative thereto is a plunger, generally designated 52. Plunger 52, which is cast from aluminum, includes a bottom circular plate 54. Five bosses 56, arranged in alignment with press plate bosses 42, downwardly extend from the bottom surface of plate 54 and insert within the ends of springs 63. The top, wider portion of a vertical, axial passageway 58 formed within plunger 52 is lined with cylindrical bushing 59, preferably made of Delrin TM plastic. A radially outward lip of bushing 59 fits within an annular recess 61 formed in the top surface of plunger 52 to maintain the axial position of bushing 59.

Mounted on bosses 42, 56 and extending therebetween are five helical compression springs 63 made of stainless steel. When compressed, springs 63 bias apart plunger 52 and press plate 35. It will be appreciated that by replacing springs 63 with different springs having different spring rates, or by changing the number of springs used, an operator of press apparatus 10 can adjust the biasing force applied to press plate 35. In addition, the spring function can be provided by other types of springs or by an elastomeric material which resists deformation.

With reference to FIGS. 2 and 3, in the preferred embodiment the reciprocating vertical movement of press plate 35 is achieved with the use of threaded drive screw 75 coupled to a crank assembly. Drive screw 75 is made of stainless steel and includes a spiraling square thread along a middle section 76 of its axial length.

Drive screw 75 also includes a non-threaded section 77 at its lower end with an internally threaded axial bore therein.

Drive screw 75 extends freely, i.e. without threaded engagement, through vertical passageway 79 in top beam 12. Bushing 80, which is made of Delrin TM plastic and which lines the upper regions of passageway 79, both prevents potentially damaging contact between the screw thread and the aluminum construction of top beam 12 and limits wobble of drive screw 75. Located within a parallelepiped-shaped cavity 81 in the lower surface of top beam 12 is drive shoe set 82. Drive shoe set 82 is a connectable, mating pair of Delrin TM plastic pieces which together define an internal threaded bore which threadedly engages drive screw 75. Drive shoe set 82 has an exterior shape designed to tightly fit within cavity 81 so as to not experience rotation therein. The upper face of cross beam 18 is flush with the underside of drive shoe set 82 to ensure drive shoe set 82 does not fall out from cavity 81. It is within the scope of the present invention that drive shoe set 82 or an equivalent screw thread engaging structure be securely affixed to or incorporated into top beam 12 or cross beam 18. Threaded drive screw section 76 also freely extends through Delrin TM bushing 84, which lines an aperture within cross arm 18 and which is in alignment below the threaded bore in drive shoe set 82.

The non-threaded section 77 of drive screw 75 is used to operably attach plunger 52 to drive screw 75 in a rotatable manner. It will be appreciated that if drive screw 75 were not free to rotate relative to plunger 52, springs 63 would experience unacceptable twisting forces as press plate 35 is not designed to rotate during operational engagement with a container. As best shown in FIG. 3, non-threaded section 77 extends through upper washer 86, through plunger bushing 59 and vertical passageway 58, and projects slightly beyond the lower surface of plunger plate 54. A left handed hex-head fastener 88 and washer 89 are secured to the axial internal bore of non-threaded section 77 to prevent drive screw 75 from being withdrawn from plunger passageway 58. Upper washer 86, which fits within plunger annular recess 61, prevents the drive screw thread from contacting bushing 59.

At its top end, drive screw 75 includes a threaded spindle 78 which is fixedly attached in a non-rotating fashion to one end of crank arm 72. Crank handle 73 is coupled to the other end of crank arm 72 so as to be rotatable relative to arm 72 to make cranking more convenient for an operator.

Referring again to FIGS. 1 and 2, a preferred device to operationally mount press apparatus 10 is shown. Cast aluminum hanger assembly 93 is attached to side bar 14 via fasteners 94, and includes a J-shaped hanger 95 shaped to fit over the side wall of a stand alone sink. Rearwardly and forwardly extending L-shaped flanges 97 mount suction cups 99 which adhere to the sink wall to prevent sliding of press apparatus 10.

The structure of press apparatus 10 will be further understood in view of the following explanation of its operation to squeeze liquid from canned tuna. Press apparatus 10 is first installed on a sink (not shown) by lowering the apparatus body into the sink such that hanger 95 extends over the sink wall. Urging press apparatus 10 toward the supporting sink wall results in suction cups 33, 99 engaging the sink wall to prevent apparatus slippage. In preparation for operation, press plate 35 is moved to a raised or retracted position by rotating crank arm 72 in a counterclockwise direction as viewed from above. A user then cuts open the lid, i.e. one end, of the food container or can (not shown). After excess liquid is typically poured out, and with the opened lid still inside the can, the can is inverted such that the opened lid faces the sink bottom. The can is then placed on container supporting base 22 such that the opened lid rests on concave upper surface 32 of platform 30, and the container sides downwardly extend or overhang the perimeter or periphery of platform 30.

Crank arm 72 is then rotated in a clockwise direction to thereby rotate drive screw 75. Due to the threaded engagement with drive shoe set 82, drive screw 75 screws downward to cause plunger 52 and press plate 35 to be lowered until press plate 35 comes into contact with the bottom end, which due to the can inversion is now the upwardly facing end, of the can. As rotation of crank arm 72 continues, press plate 35 continues translating downward to force the can bottom end downward, thereby effectively squeezing the can contents which are trapped inside the can between the opened lid and bottom end. Retained liquid drains from the squeezed food, such as tuna, around the cut edge of the opened lid and the periphery of platform 30 and passes into the sink. Because the retained liquid is not normally forced from the tuna as fast as drive screw 75 can be rotated, press plate 35 begins to be forced upward toward plunger 52 against the bias of springs 63, which are being compressed between press plate 35 and plunger 52. It will be appreciated that upper washer 86 keeps plunger 52 from sliding up drive screw 75. Drive screw 75 can continue to be rotated until the lower surface of plunger plate 54 abuts stop shoulder 46 of press plate sleeve 40. This abutting relationship provides an operator with a visual indication of when crank rotation should be halted.

It will be appreciated that at this point in the process an operator can leave unattended the preferred embodiment of press apparatus 10, which will continue to forcibly squeeze liquid from the tuna. Specifically, as controlled by the spring rates and quantity of springs 63, press plate 35 continues to be forced downward by the biasing nature of the compressed springs 63. It will be appreciated that this biasing force can be significant. For example, when five of the preferred springs having a spring rate of about 38.8 lbs/inch are compressed the full amount of about an inch, a biasing force of nearly 200 pounds is provided. As additional liquid drains from the tuna in the manner described above, springs 63 extend such that press plate 35 remains in contact with the can. Press plate 35 continues to move downward as springs 63 extend until the upper surface of plunger plate 54 encounters retaining ring 48, which halts further movement of press plate 35 relative to plunger 52. If more liquid is needed to be squeezed from the canned tuna, crank arm 72 can again be rotated to once again force downward press plate 35 and compress springs 63.

When sufficient liquid has been squeezed from the tuna, crank arm 72 can be rotated in a counter-clockwise direction to raise press plate 35 such that the container can be removed from platform 30. The opened lid can then be removed from within the container, and the tuna within the container can then be emptied to be used in food preparation. To remove press apparatus 10 or move it to another sink, the vacuum formed in suction cups 33, 99 merely needs to be broken and press apparatus 10 then lifted and carried to another location.

Figure 4:
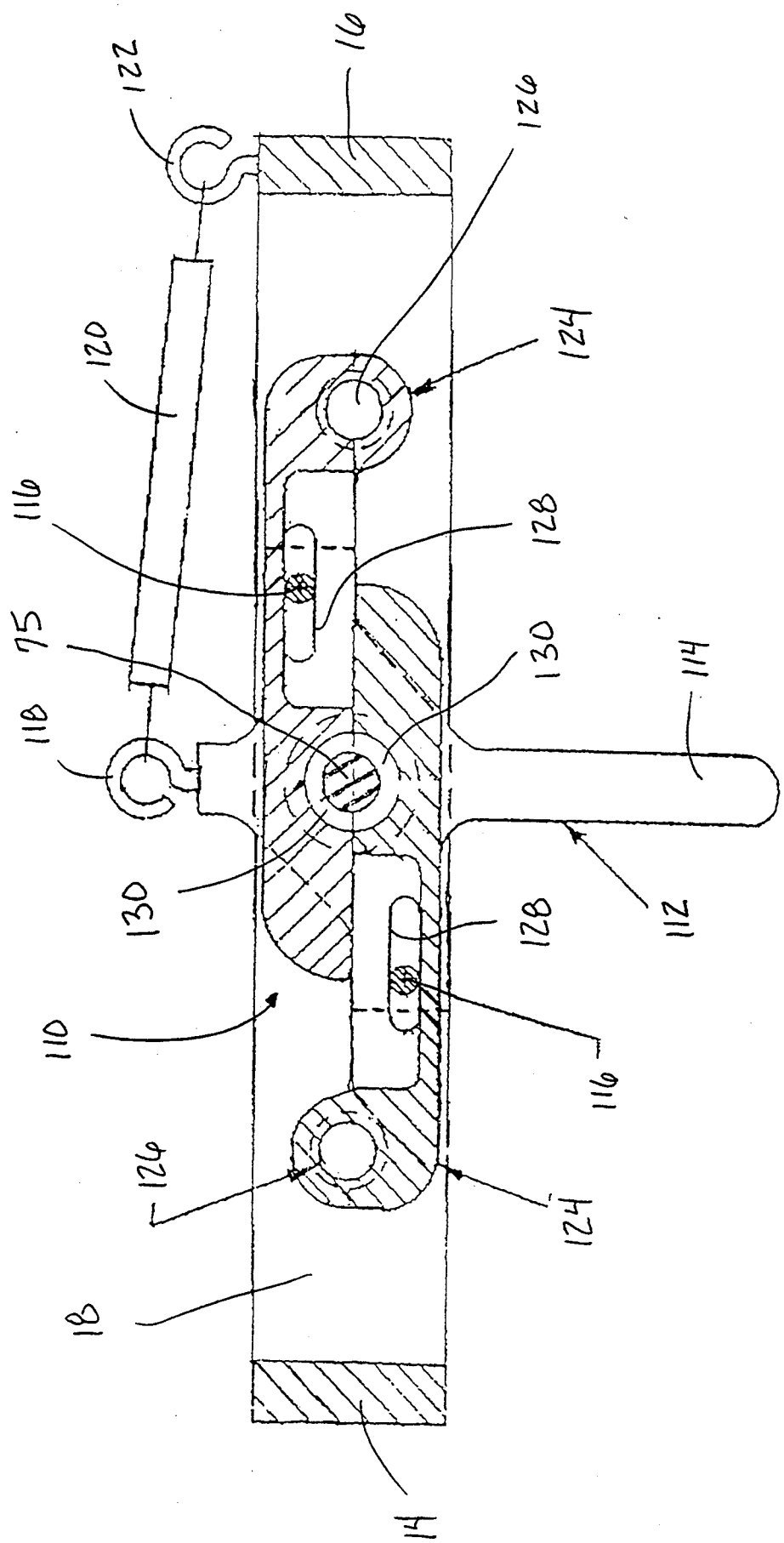
FIG. 4 is a top cross-sectional view of the drive screw quick release mechanism of an alternate embodiment of the present invention.

Referring now to FIG. 4, there is shown a top cross-sectional view of a drive screw quick release mechanism of an alternate invention embodiment for facilitating raising or lowering press plate 35. The quick release mechanism, generally designated 110, replaces drive shoe set 82 fixed within or attached to top beam 12 and includes a lever actuator 112 rotatably mounted to the top side of cross beam 18. Lever actuator 112 includes handle 114, two arms laterally extending from handle 114 and from which upwardly project camming dowels 116, and hook 118 opposite handle 114. A tension spring 120, or alternatively an elastomeric strap or other biasing means, spans hook 118 and another hook 122 or fastener mounted to side bar 16. Spring 120 can be encased to provide proper sanitary conditions.

Quick release mechanism 110 also includes a pair of drive shoes 124 which pivot about pivot pins 126 extending between cross beam 18 and top beam 12. Each drive shoe 124 includes slot 128, which slidably receives a camming dowel 116 therein, and a threaded half bore 130. When drive shoes 124 are installed and in an operational alignment, the threaded half bores 130 of the pair of drive shoes 124 cooperate to define a bore having a continuous helical thread which threadedly engages the thread of drive screw 75.

During food pressing operations, quick release mechanism 110 is aligned as shown in FIG. 4, allowing drive screw 75 to be rotated to forcibly lower press plate 35. After the food product has been squeezed, rather than counter-rotating drive screw 75 to raise press plate 35 to allow removal of the container, quick release mechanism 110 is utilized. By rotating handle 114 counter-clockwise in FIG. 4 against the biasing force of spring 120, camming dowels 116 are moved outward. As slots 128 engage dowels 116, drive shoes 124 move outward and cause threaded half bores 130 to become spaced and out of engagement with drive screw 75. An operator can then manually lift or pull up drive screw 75, and thereby press plate 35, without counter rotation of the crank assembly. Spring 120 returns lever actuator 112 and thereby drive shoes 124 back to an operational position when handle 114 is released. It will be appreciated that quick release mechanism 110 will be especially advantageous for use with longer containers where the press plate travels significant distances during operation.

While this invention has been described as having a preferred design, the present invention may be further modified within the spirit and scope of this disclosure. For instance, press apparatus 10, or more particularly its press plate 35 and squeezed container, could be mounted horizontally or at an angle. Moreover, instead of a crank and drive screw combination, a shaft attached to a levered handle and including a pawl and ratchet mechanism could be used to force down and hold down plunger 52 during operation. Other materials for the various components could be substituted. This application is therefore intended to cover any variations, uses, or adaptations of the invention using its general principles. Further, this application is intended to cover such departures from the present disclosure as come within known or customary practice in the art to which this invention pertains.

What is claimed is:

1. A food press apparatus for squeezing liquid from a food product in a container comprising:
    a frame;
    a drive component operatively connected to said frame, said drive component movable in a first direction relative to said frame;
    a plunger operatively connected to said drive component to be movable therewith;
    a press plate for operatively engaging one end of the container, said press plate being operatively connected to said plunger;
    at least one spring means compressible between the plunger and the press plate for biasing the press plate in the first direction away from the plunger;
    a platform for engaging another end of the container, said platform positioned in spaced relationship with said press plate to allow introduction of the container therebetween, wherein said press plate moves toward said container engaging platform when moving in the first direction; and
    a sleeve extending from said press plate in a direction opposite said first direction, said sleeve including an interior hollow sized to receive said plunger therein, and wherein said sleeve interior hollow includes a stop shoulder structured and arranged to contact said plunger and limit the compression of said at least one spring means.

2. The food press apparatus of claim 1 wherein said drive component comprises a drive screw threadedly connected to said frame, said drive screw being movable in the first direction when rotated relative to said frame.

3. The food press apparatus of claim 2 further comprising quick release means for allowing said press plate to be translatable without rotation of said drive screw.

4. The food press apparatus of claim 2 further comprising a rotatable crank assembly connected to said drive screw.

5. The food press apparatus of claim 1 wherein said container engaging platform is fixedly attached to said frame.

6. The food press apparatus of claim 1 wherein said container engaging platform comprises a plate sized and shaped to fit within an interior of the container.

7. The food press apparatus of claim 1 further comprising a hanger assembly for removably mounting the frame to a sink wall, said hanger assembly comprising at least one suction member.

8. A contained food press apparatus for squeezing liquid from a food product in a container comprising:
    a frame;
    a drive screw threadedly connected to said frame, said drive screw being movable in a first direction when rotated relative to said frame;
    a rotatable crank assembly connected to said drive screw;
    a hanger assembly for removably mounting the frame to a sink wall;
    a plunger operatively connected to said drive screw to be movable therewith;
    a press plate for operatively engaging one end of the container, said press plate being operatively connected to said plunger;
    at least one spring means compressible between the plunger and the press plate for biasing the press plate in the first direction away from the plunger; and
    a platform plate for engaging another end of the container, said platform plate attached to said frame and positioned in spaced relationship with said press plate to allow introduction of the container therebetween, said platform plate being sized and shaped to fit within an interior of the container, and wherein said press plate moves toward said container engaging platform plate when moving in the first direction.

9. The contained food press apparatus of claim 8 further comprising quick release means for allowing said press plate to be translatable without rotation of said drive screw.

* * * * *